(12) United States Patent
Corrêa et al.

(10) Patent No.: US 9,933,093 B2
(45) Date of Patent: Apr. 3, 2018

(54) AIRCRAFT FUEL LINE COUPLINGS IN COMPLIANCE WITH SURVIVABLE CRASH AND LIGHTNING STRIKE REQUIREMENTS

(71) Applicant: EMBRAER S.A., São José dos Campos (BR)

(72) Inventors: Luis Gustavo D'Andrea Demétrio Corrêa, São José dos Campos (BR); Eduardo Rezende, São José dos Campos (BR)

(73) Assignee: EMBRAER S.A., São José dos Campos—SP (BR)

( * ) Notice: Subject to any disclaimer, the term of this patent is extended or adjusted under 35 U.S.C. 154(b) by 574 days.

(21) Appl. No.: 14/556,010

(22) Filed: Nov. 28, 2014

(65) Prior Publication Data

US 2016/0153597 A1 Jun. 2, 2016

(51) Int. Cl.
*F16L 27/12* (2006.01)
*F16L 23/08* (2006.01)
*F16L 25/01* (2006.01)
*B64D 37/00* (2006.01)
*F16L 23/06* (2006.01)

(52) U.S. Cl.
CPC ............ *F16L 27/12* (2013.01); *B64D 37/005* (2013.01); *F16L 23/06* (2013.01); *F16L 23/08* (2013.01); *F16L 25/01* (2013.01)

(58) Field of Classification Search
CPC . F16L 27/12; F16L 25/01; F16L 23/06; F16L 23/08; B64D 37/005

USPC ............. 285/302, 409; 244/131, 135 R
See application file for complete search history.

(56) References Cited

U.S. PATENT DOCUMENTS

| 5,011,193 | A | * | 4/1991 | Porte | F16L 27/12 |
| | | | | | 285/302 X |
| 5,024,469 | A | * | 6/1991 | Aitken | F16L 27/12 |
| | | | | | 285/302 |
| 8,172,272 | B2 | * | 5/2012 | Petit | F16L 25/01 |
| | | | | | 285/302 X |
| 2008/0078880 | A1 | * | 4/2008 | Petit | F16L 25/01 |
| 2012/0057267 | A1 | * | 3/2012 | Petit | F16L 25/01 |
| 2012/0132755 | A1 | * | 5/2012 | Petit | F16L 27/12 |
| 2013/0181441 | A1 | | 7/2013 | Courpet et al. | |

* cited by examiner

*Primary Examiner* — Gregory J Binda
*Assistant Examiner* — Zachary T Dragicevich
(74) *Attorney, Agent, or Firm* — Nixon & Vanderhye P.C.

(57) ABSTRACT

Fuel line coupling components couple together coaxially aligned fuel lines (e.g., single wall metal aircraft fuel lines) and allow for relative longitudinal movements therebetween. The fuel line coupling component may include an outer tubular housing member, an inner tubular coupling member, a tubular collar member and a coupler. The inner tubular coupling member is adapted to being attached to a terminal end of one of the fuel lines and is received within an interior space of the outer tubular housing member for slidable movements therewithin to allow the fuel line attached thereto to be telescopically extended and retracted relative to the outer tubular housing. The tubular collar member is coaxially aligned with the outer tubular member and is adapted to being attached to a terminal end of the second fuel line in coaxial opposition to the first fuel line.

19 Claims, 5 Drawing Sheets

AIRCRAFT FUEL LINE COUPLINGS IN COMPLIANCE WITH SURVIVABLE CRASH AND LIGHTNING STRIKE REQUIREMENTS

FIELD

The embodiments disclosed herein relate generally to aircraft fuel system components, especially aircraft fuel line coupling components that are adapted to comply with survivable crash and lightning requirements.

BACKGROUND

In the aviation industry, there is a very grave concern about an aircraft fire due to the rupture of the fuel lines following a survivable crash of the aircraft (i.e., an event whereby the aircraft crashes with most if not all of the aircraft occupants surviving the crash event). The current airworthiness standards for fuel lines installed on transport category aircraft (14 CFR §25.993(f)) requires that each fuel line within the fuselage of the aircraft must be designed and installed to allow a reasonable degree of deformation and stretching without leakage. Aviation authorities have therefore indicated that a certain deflection of a duct in a guillotine-like test is acceptable to show compliance with such requirement.

One prior proposal for aircraft fuel line compliance is known from U.S. Patent Publication 2013/0181441. According to this prior proposal, an anti-buckling coupling device for fuel double-walled piping is provided. The proposed coupling is intended to be installed at the location of the fuel line anchor points, so that the weight of the coupling is supported by the aircraft structure and not by the fuel line piping. Thus, these proposed couplings are linked to the ducts by means of a groove connector, or sphere cylinder, i.e., a connector that combines a swivel connection and a sliding connection along the longitudinal axis of the duct.

Improvements to aircraft fuel system components which comply with airworthiness standards for fuel lines installed on transport category aircraft for both survivable crash and lightning strike events are however still needed. It is towards fulfilling such needs that the embodiments disclosed herein are directed.

SUMMARY

In general, the embodiments disclosed herein are directed toward fuel line coupling components which are adapted for use with single-walled aircraft fuel lines and can be installed in any location of the fuel supply piping system (i.e., not necessarily at the fuel line anchor points). In addition, the embodiments disclosed herein address the concerns related to post-crash fire due to duct rupture and propose innovative solutions by which fuel line tubes are grounded, e.g., by use of metallic blades in lieu of bonding straps.

The embodiment disclosed herein therefore provides for fuel line coupling components which couple together coaxially aligned fuel lines to allow for relative longitudinal movements therebetween. According to certain embodiments, the fuel line coupling component will include an outer tubular housing member, an inner tubular coupling member, a tubular collar member and a coupler. The inner tubular coupling member is adapted to being attached to a terminal end of one of the fuel lines and is received within an interior space of the outer tubular housing member for slidable movements therewithin to allow the fuel line attached thereto to be telescopically extended and retracted relative to the outer tubular housing. The tubular collar member is coaxially aligned with the outer tubular member and is adapted to being attached to a terminal end of the second fuel line in coaxial opposition to the first fuel line. The coupler is provided so as to couple the coaxially aligned outer tubular member and the tubular collar member, whereby the fuel lines are fluid-connected to one another.

The inner tubular coupling member may include an O-ring seal for establishing a fluid-tight seal with an interior surface of the outer tubular housing member. The distal end of the outer tubular housing member may also include an O-ring seal. According to some embodiments, the outer tubular housing member includes at least one vent aperture establishing communication between the interior space thereof and an exterior atmosphere. The vent aperture may be positioned at a distal end of the outer tubular housing member.

Certain embodiments are provided with at least one (usually a plurality) electrical bonding blade having one end connected to the outer tubular housing member and an opposite end in electrical contact with an exterior surface of the first fuel line when connected to the inner tubular coupling member. The electrical bonding blade according to some embodiments may be a one-piece bent metal spring contact structure having a proximal end establishing an attachment pad attached to the outer tubular housing member and a distal end establishing a V-shaped or U-shaped contact pad. If a plurality of electrical bonding blades are provided, they may be circumferentially spaced apart relative to one another.

An aircraft provided with the fuel line coupling component as herein described will therefore be compliant with survivable crash and lightning strike certification requirements.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Figure 1:
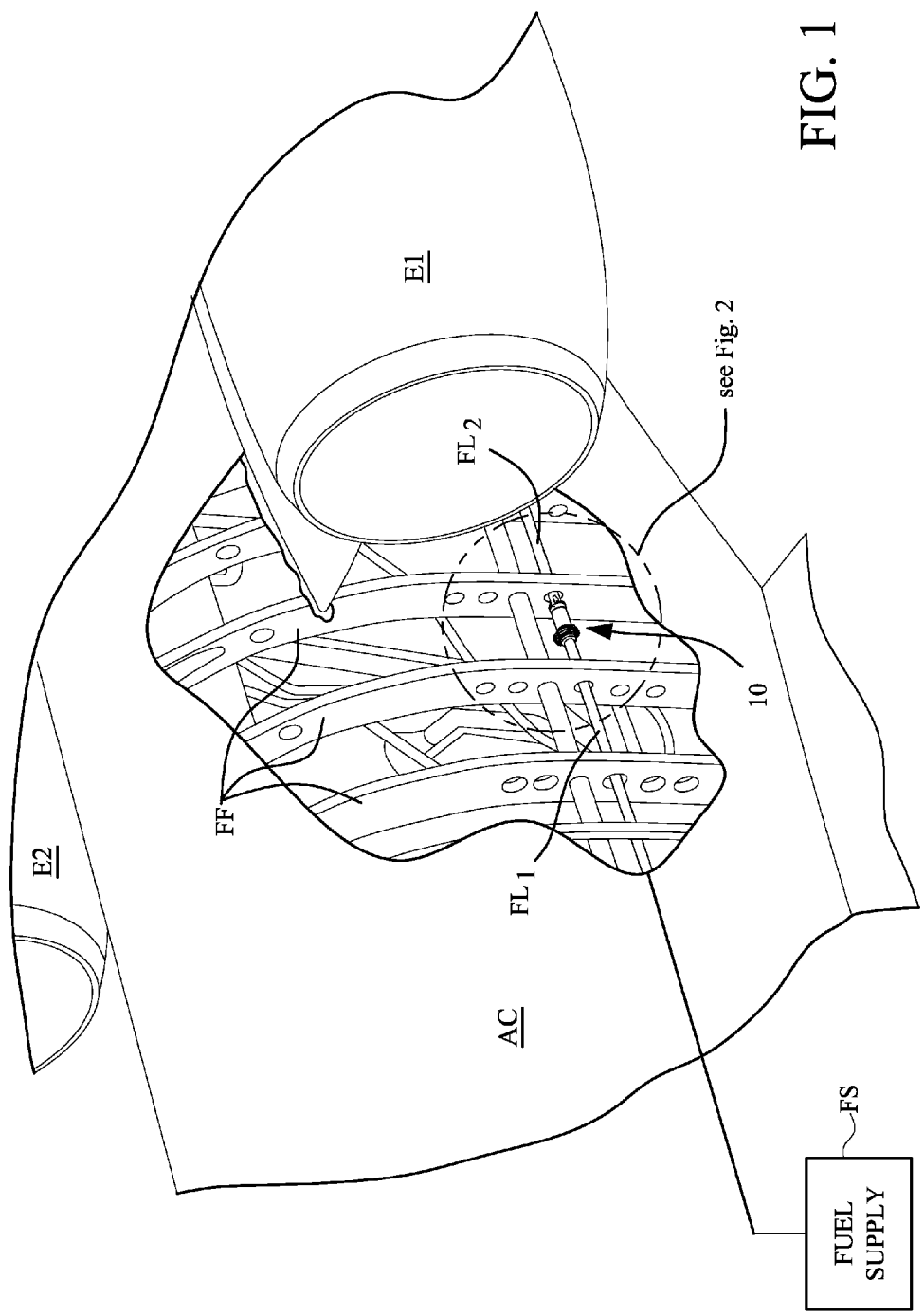
FIG. 1 is perspective view of a partially exposed aircraft fuselage section depicting an exemplary installation assembly for a fuel line coupling component in accordance with an embodiment of the invention as described hereinafter.
Figure 2:
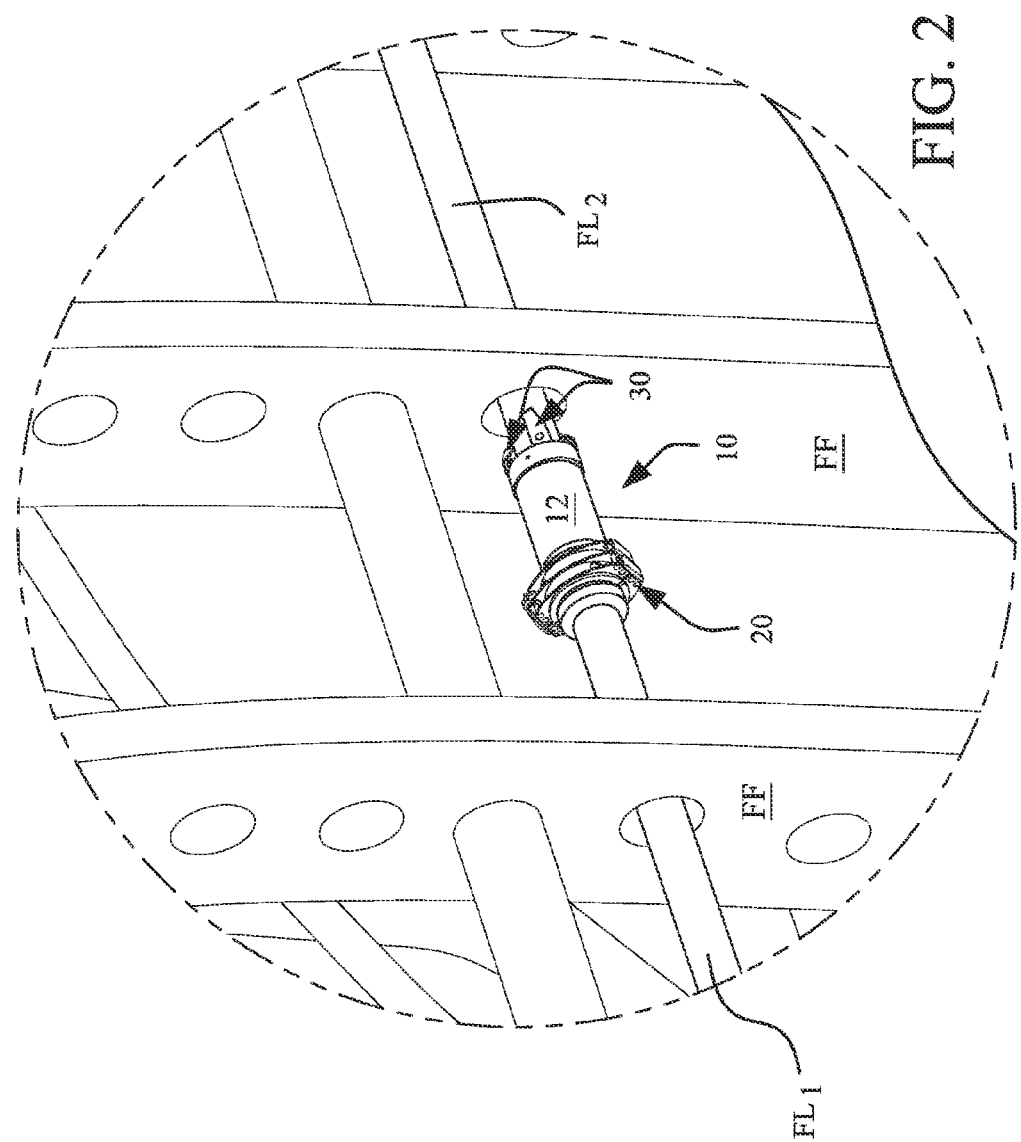
FIG. 2 is an enlarged view of the installation assembly for the fuel line coupling component as shown in FIG. 1.

Accompanying FIGS. 1 and 2 schematically depict a fuel line coupling component 10 installed in the fuselage frame structures (an exemplary few of which are noted by the identifier FF) of an aircraft AC so as to couple coaxially positioned rigid metal fuel lines $FL_1$ and $FL_2$ which are provided to supply fuel from an onboard fuel supply FS to the aircraft engines E1 and E2.

Figure 3:
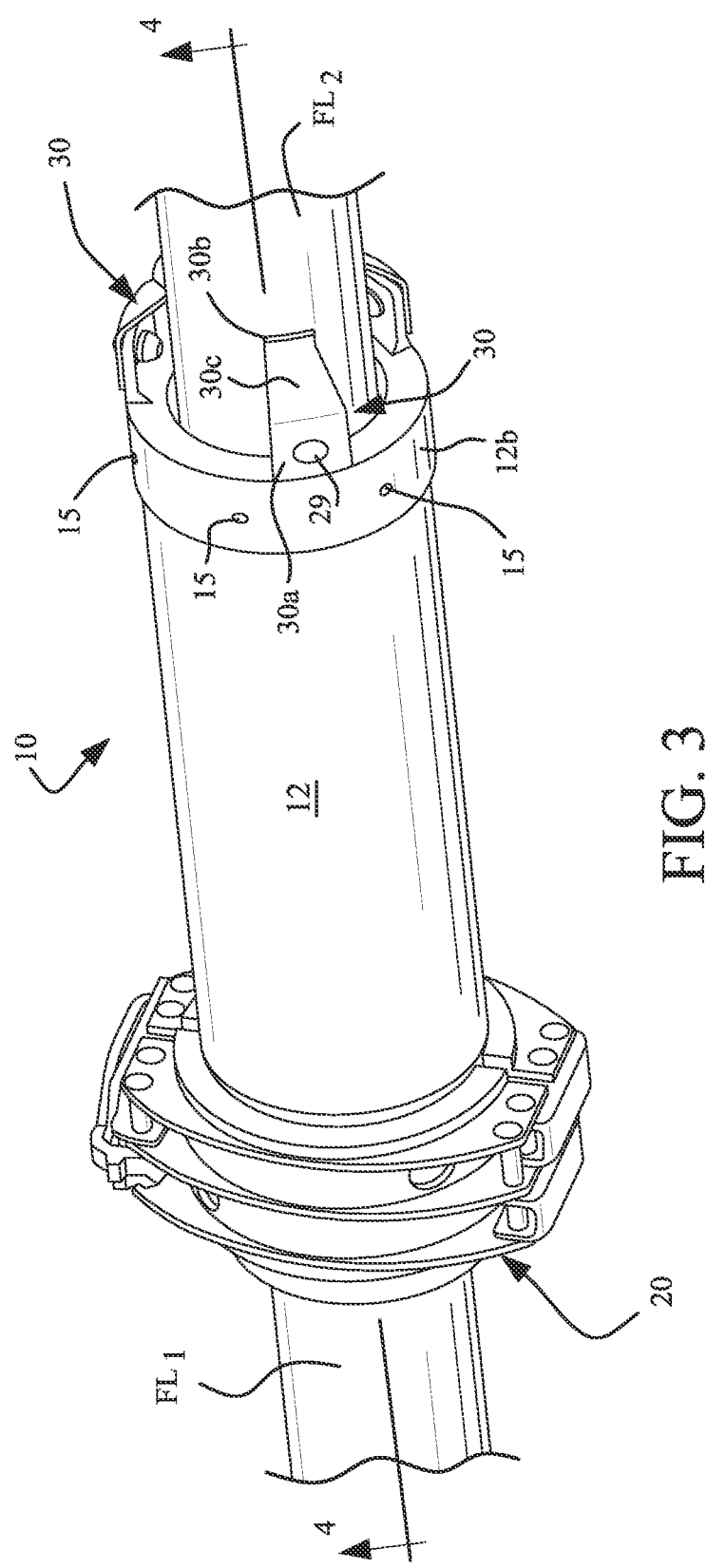
FIG. 3 is a perspective view of the fuel line coupling component employed in the assembly as depicted in FIGS. 1 and 2.
Figure 4:
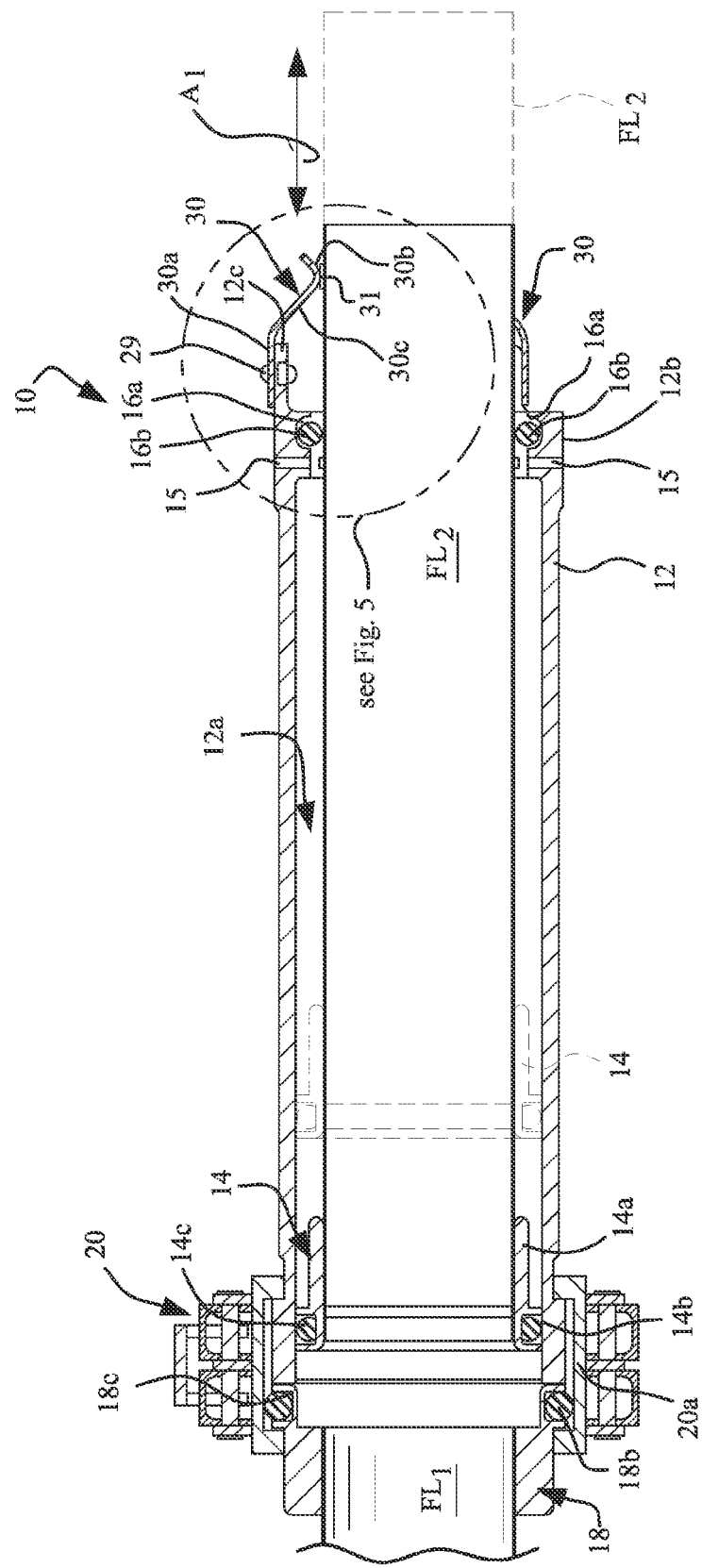
FIG. 4 is a cross-sectional elevational view of the fuel line coupling component as taken along line 4-4 in FIG. 3.

As is perhaps better shown by FIGS. 3 and 4, the coupling component 10 includes a rigid outer tubular housing member 12 and an inner tubular coupling member 14 positioned coaxially within the outer tubular housing member 12. A terminal end of the fuel line $FL_2$ is immovably fixed to the tubular collar 14a of the coupling member 14. An elastomeric O-ring seal 14b is positioned within an annular recessed seat 14c of the coupling member 14 so as to prevent fuel leakage. The tubular coupling member 14 and the fuel line $FL_2$ are therefore telescopically mounted within the outer housing tube thereby defining an annular interior space 12a therebetween. In such a manner, therefore, the tubular coupling member 14 and the fuel line $FL_2$ are capable of reciprocal sliding movement longitudinally within the interior space 12a of the outer tubular housing member 12 (e.g., as noted by arrow A1 and the exemplary dashed line representations in FIG. 4 of one possible alternative position of the coupling member 14 and fuel line $FL_2$). An elastomeric O-ring seal 16b is positioned within an annular seat 16a at the distal end 12b of the outer tubular housing member 12 so as to allow such sliding movement of the fuel line $FL_2$.

It will be appreciated that no fuel will be present in the interior annular space 12a surrounding the fuel line $FL_2$ during use. In order to prevent a hydraulic air lock from occurring upon telescopic movement of the coupling member 14 (and hence the fuel line $FL_2$) within the outer tubular housing member 12, a series of circumferentially spaced apart vent apertures 15 are formed at the distal end 12b of the outer tubular housing member 12. The relief apertures 15 communicate the exterior ambient atmosphere with the interior annular space 12a thereby allowing venting of such space to occur.

The terminal end of the coaxially aligned fuel line $FL_1$ is immovably fixed within a tubular collar member 18. A U-shaped bridge 20a associated with a conventional camlock split ring coupler 20 is provided so as to span the abutted end of the outer housing 14 and the end coupling member 18. An elastomeric O-ring 18b is provided in a seat 18c associated with the end coupling member 18 so as to form a fluid-tight seal with the bridge 20a.

A plurality of circumferentially spaced apart electrical bonding blades 30 are provided so as to electrically interconnect the fuel line $FL_2$ with the outer tubular housing member 12 so as to dissipate static electricity and/or the electrical potential difference therebetween.

Figure 5:
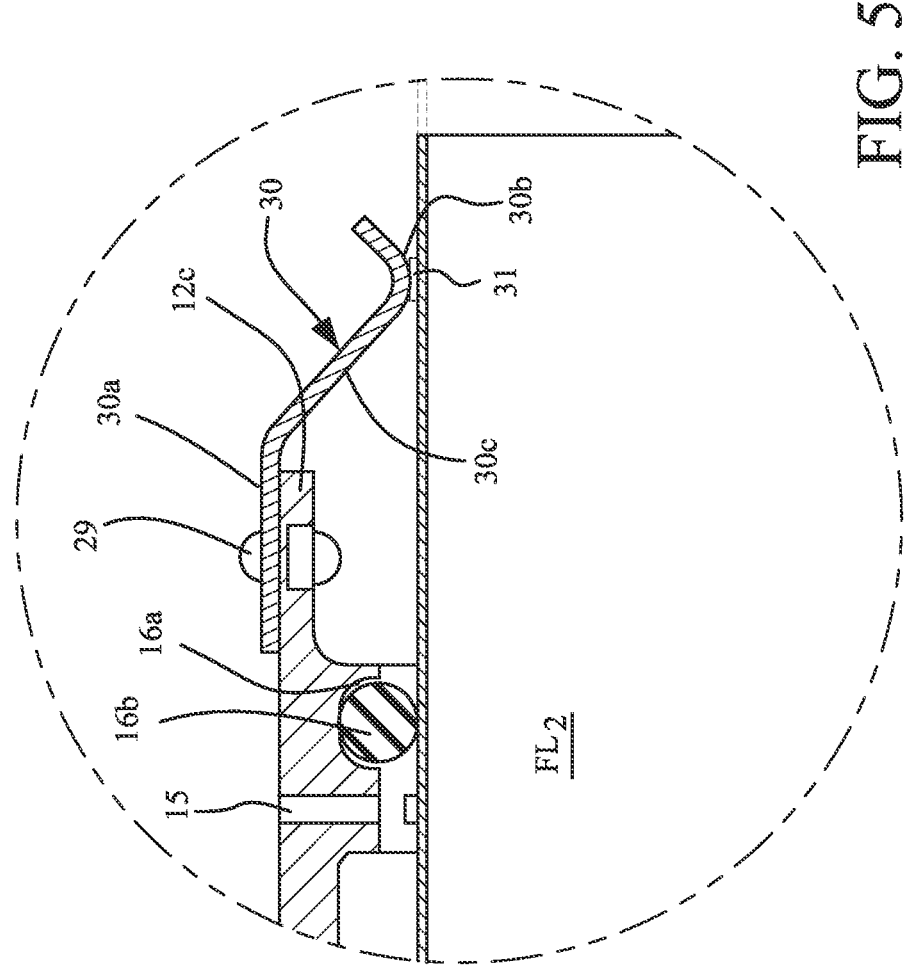
FIG. 5 is an enlarged side view of an exemplary electrical bonding blade employed in the embodiment of the fuel line coupling component.

As is shown in FIG. 5, the blades 30 are essentially one-piece bent metal spring contact structures having a proximal end 30a establishing an attachment pad which is attached to a mounting lug 12c associated with the outer tubular housing member 12 at its distal end 12b by means of rivets, bolts, welding or the like identified by reference numeral 29. The distal end 30b of each blade 30 is formed into a generally V-shaped or U-shaped contact pad which establishes sliding physical contact with an exterior surface of the fuel line $FL_2$. To mitigate against the wear of metallic parts, a carbon or graphite brush 31 may be affixed to the contact pad 30. An intermediate planar section 30c unitarily joins the proximal and distal ends 30a, 30b, respectively.

The longitudinal movement of the coupling member 14 (and hence the fuel line $FL_2$) within the outer tubular housing member 12 can vary over a large extent.

Although the discussion above has been focused on a fuel coupling component that is usefully employed in an aircraft, it will be understood that the description provided herein is presently considered to be the most practical and preferred embodiments of the invention. Thus, the fuel line component as described herein may be employed with any vehicle. As such, the invention is not to be limited to the disclosed embodiments, but on the contrary, is intended to cover various modifications and equivalent arrangements included within the spirit and scope thereof.

What is claimed is:

1. A fuel line coupling component for coupling coaxially aligned first and second fuel lines to allow longitudinal movement therebetween, wherein the fuel line coupling component comprises:
    an outer tubular housing member which defines an interior space and includes at least one vent aperture establishing communication between the interior space and an exterior atmosphere;
    an inner tubular coupling member adapted to being attached to a terminal end of the first fuel line, the inner tubular member being received within the interior space of the outer tubular housing member for slideable movements therewithin to allow the first fuel line attached thereto to be telescopically extended and retracted relative to the outer tubular housing;
    a tubular collar member coaxially aligned with the outer tubular member and adapted to being attached to a terminal end of the second fuel line in coaxial opposition to the first fuel line;
    a coupler which couples the coaxially aligned outer tubular member and the tubular collar member, whereby the fuel lines are fluid-connected to one another, and
    at least one electrical bonding blade having one end immovably connected to the outer tubular housing member and an opposite end in sliding electrical contact with an exterior surface of the first fuel line when connected to the inner tubular coupling member.

2. The fuel line coupling component as in claim 1, wherein the inner tubular coupling member includes an O-ring seal for establishing a fluid-tight seal with an interior surface of the outer tubular housing member.

3. The fuel line coupling component as in claim 1, wherein the outer tubular housing member includes a distal end which includes the at least one vent aperture.

4. The fuel line coupling component as in claim 3, wherein the distal end of the outer tubular housing member includes an O-ring seal to provide a fluid-tight seal with an exterior surface of the first fuel line when connected to the inner tubular coupling member.

5. The fuel line coupling component as in claim 1, wherein the at least one electrical bonding blade is a one-piece bent metal spring contact structure having a proximal end establishing an attachment pad immovably attached to the outer tubular housing member and a distal end establishing a contact pad in sliding electrical contact with the exterior surface of the first fuel line.

6. The fuel line coupling component as in claim 5, wherein the contact pad of at the distal end of the at least one electrical bonding blade in sliding electrical contact with the exterior surface of the first fuel line is V-shaped or U-shaped.

7. The fuel line coupling component as in claim 6, wherein the contact pad includes a carbon or graphite brush in sliding electrical contact with the exterior surface of the first fuel line.

8. The fuel line coupling component as in claim 1, further comprising a plurality of electrical bonding blades each having one end immovably connected to the outer tubular housing member and an opposite end in sliding electrical contact with the exterior surface of the first fuel line when connected to the inner tubular coupling member.

9. The fuel line coupling component as in claim 8, wherein the plurality of electrical bonding blades are circumferentially spaced apart relative to one another.

10. An aircraft fuel line assembly comprising:
first and second coaxially aligned metal fuel lines; and
a fuel line coupling component for coupling the coaxially aligned first and second fuel lines to allow longitudinal movement therebetween, wherein the fuel line coupling component comprises,
  (i) an outer tubular housing member which defines an interior space and includes at least one vent aperture establishing communication between the interior space and an exterior atmosphere;
  (ii) an inner tubular coupling member adapted to being attached to a terminal end of the first fuel line, the inner tubular member being received within the interior space of the outer tubular housing member for slideable movements therewithin to allow the first fuel line attached thereto to be telescopically extended and retracted relative to the outer tubular housing;
  (iii) a tubular collar member coaxially aligned with the outer tubular member and adapted to being attached to a terminal end of the second fuel line in coaxial opposition to the first fuel line;
  (iv) a coupler which couples the coaxially aligned outer tubular member and the tubular collar member, whereby the fuel lines are fluid-connected to one another, and
  (v) at least one electrical bonding blade having one end immovably connected to the outer tubular housing member and an opposite end in sliding electrical contact with an exterior surface of the first fuel line when connected to the inner tubular coupling member.

11. The aircraft fuel line assembly as in claim 10, wherein the inner tubular coupling member includes an O-ring seal for establishing a fluid-tight seal with an interior surface of the outer tubular housing member.

12. The aircraft fuel line assembly as in claim 10, wherein the outer tubular housing member includes a distal end which includes the at least one vent aperture.

13. The aircraft fuel line assembly as in claim 12, wherein the distal end of the outer tubular housing member includes an O-ring seal to provide a fluid-tight seal with an exterior surface of the first fuel line when connected to the inner tubular coupling member.

14. The aircraft fuel line assembly as in claim 10, wherein the at least one electrical bonding blade is a one-piece bent metal spring contact structure having a proximal end establishing an attachment pad immovably attached to the outer tubular housing member and a distal end establishing a contact pad in sliding contact with the exterior surface of the first fuel line.

15. The aircraft fuel line assembly as in claim 14, wherein the contact pad of at the distal end of the at least one electrical bonding blade in sliding electrical contact with the exterior surface of the first fuel line is V-shaped or U-shaped.

16. The fuel line coupling component as in claim 15, wherein the contact pad includes a carbon or graphite brush in sliding electrical contact with the exterior surface of the first fuel line.

17. The aircraft fuel line assembly as in claim 10, further comprising a plurality of electrical bonding blades each having one end immovably connected to the outer tubular housing member and an opposite end in sliding electrical contact with the exterior surface of the first fuel line when connected to the inner tubular coupling member.

18. The aircraft fuel line assembly as in claim 17, wherein the plurality of electrical bonding blades are circumferentially spaced apart relative to one another.

19. An aircraft which comprises at least one engine, an onboard fuel supply for the engine, and an aircraft fuel line assembly as in claim 10 to provide fuel from the fuel supply to the engine.

* * * * *